United States Patent
Bedi et al.

(10) Patent No.: US 6,759,942 B2
(45) Date of Patent: Jul. 6, 2004

(54) VEHICLE COMMUNICATION SYSTEM IMPLEMENTED REUSING EXISTING VEHICLE COMPONENTS

(75) Inventors: Gurminder Singh Bedi, Bloomfield Hills, MI (US); John Robert Van Wiemeersch, Novi, MI (US); Ronald Hugh Miller, Saline, MI (US); Scott Howard Gaboury, Ann Arbor, MI (US); Steven Yellin Schondorf, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 212 days.

(21) Appl. No.: 09/682,705

(22) Filed: Oct. 8, 2001

(65) Prior Publication Data

US 2003/0067380 A1 Apr. 10, 2003

(51) Int. Cl.⁷ .......................... B60R 25/00; G05B 19/00
(52) U.S. Cl. ...................... 340/5.72; 340/436
(58) Field of Search .................. 340/5.72, 5.71, 340/5.8, 436, 463, 467, 901, 902, 903, 904, 905; 180/167, 168

(56) References Cited

U.S. PATENT DOCUMENTS

| | | | |
|---|---|---|---|
| 5,635,923 A | | 6/1997 | Steele et al. |
| 5,708,712 A | * | 1/1998 | Brinkmeyer et al. ........ 713/181 |
| 5,781,119 A | * | 7/1998 | Yamashita et al. .......... 340/903 |
| 5,844,495 A | * | 12/1998 | Griessbach ................. 340/5.26 |
| 6,167,333 A | | 12/2000 | Gehlot |
| 6,359,552 B1 | * | 3/2002 | King .......................... 340/436 |
| 6,426,706 B1 | * | 7/2002 | King .......................... 340/903 |

* cited by examiner

Primary Examiner—Michael Horabik
Assistant Examiner—William Bangachon
(74) Attorney, Agent, or Firm—Frank A. MacKenzie

(57) ABSTRACT

A communication system is provided for an automotive vehicle (10) that uses existing vehicle components with only slight modifications that can be implemented in readily changeable software. The system includes a vehicle bus (14) and a vehicle information source coupled to the vehicle bus. The vehicle information source (28) couples vehicle information to the vehicle bus (14). The transmitter (16) transmits a first communication having a first transmitter identification code and first vehicle information. A receiver (22) is coupled to the vehicle bus. The receiver (22) couples a second communication word having second vehicle information to the vehicle bus. The automotive vehicle (10) also has a safety system and a safety system controller (34) coupled to the bus. The safety system controller (34) actuates the safety system (36) in response to the second vehicle information.

19 Claims, 2 Drawing Sheets

US 6,759,942 B2

VEHICLE COMMUNICATION SYSTEM IMPLEMENTED REUSING EXISTING VEHICLE COMPONENTS

BACKGROUND OF INVENTION

The present invention relates generally to a communication system for an automotive vehicle, and more particularly, to a communication system that allows automotive vehicles to communicate information to each other for use in various vehicle systems such as safety systems.

While operating an automotive vehicle it may be useful to transmit various vehicle operating conditions to other vehicles to facilitate crash mitigation actions. Vehicle location, vehicle weight, bumper height, vehicle type, and other information may be useful in crash mitigation.

Crash mitigation may include various actions to be performed by the automotive vehicle. Such actions include but are not limited to steering actions, braking actions, and deployment of occupant restraint devices. By receiving vehicle information, mitigation actions may be performed prior to onboard sensing which react only to forces acting directly on the vehicle.

A transponder for transmitting such information and a receiver for receiving such information may be added to a vehicle. One drawback to this approach is that added components increase the cost of the vehicle.

It would therefore be desirable to provide a vehicle communication system that uses existing vehicle hardware and therefore reduces the cost of implementation of a vehicle-to-vehicle communication system.

SUMMARY OF INVENTION

The present invention advantageously provides a communication system for an automotive vehicle that uses existing vehicle components with only slight modifications that can be implemented in readily changeable software. The present invention includes a vehicle bus and a vehicle information source coupled to the vehicle bus. The vehicle information source couples vehicle information to the vehicle bus. The transmitter transmits a first communication having a first transmitter identification code and first vehicle information. A receiver is coupled to the vehicle bus. The receiver couples a second communication word having second vehicle information to the vehicle bus. The automotive vehicle also has a safety system and a safety system controller coupled to the bus. The safety system controller actuates the safety system in response to the second vehicle information.

One advantage of the present invention is that the transmitter may be an existing vehicle transmitter such as an integrated garage door opener such as those commonly included in high-end vehicles. Another advantage of the invention is that the receiver of the communication system may use the receiver of the remote keyless entry system. By utilizing existing vehicle components, the cost of implementing such a system is greatly reduced.

Other advantages and features of the present invention will become apparent when viewed in light of the detailed description of the preferred embodiment when taken in conjunction with the attached drawings and appended claims.

DETAILED DESCRIPTION

Figure 1:
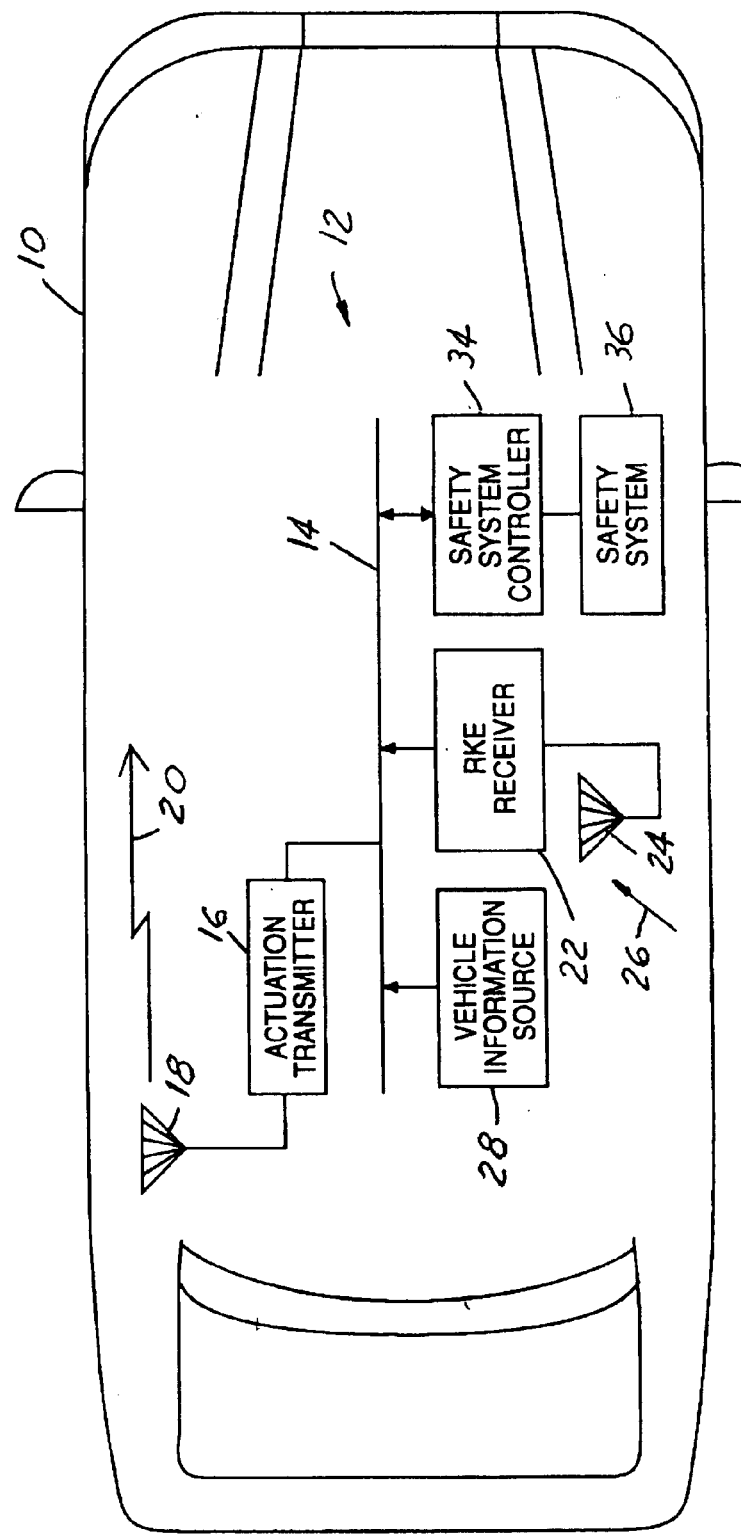
FIG. 1 is a block diagrammatic view of an automotive vehicle having a communication system according to the present invention.

Referring now to FIG. 1, an automotive vehicle 10 is illustrated having a communication system 12 formed according to the present invention. Communication system 12 uses vehicle bus 14. Vehicle communication bus 14 is a communication bus commonly employed in automotive vehicles. Communication bus 14 is a multi-wire communication bus that is used to transfer information from various vehicle systems throughout the vehicle. One example of a communication bus is the SAE standard J1850 standard communication bus. Other types of buses may include a controller area network (CAN system). An IEEE1394 firewire system is another suitable example of a suitable communication bus.

Communication system 12 may be used to communicate communication words to other vehicles through transmitter 16 and transmitting antenna 18. Transmitter 16 transmits a transmitting word 20 through antenna 18. Transmitter 16 is preferably an existing vehicle component such as an actuation transmitter such as a garage door opener. A suitable transmitter 16 may, for example, be the HomeLink® provided in many high-end Ford Motor Company vehicles. The HomeLink® system generates communication words which may be used to open garage doors and to actuate other remote control devices such as lights. With only slight modification to the software as will be further described below, various types of information may also be communicated to other vehicles.

Vehicle communication system 12 also includes a receiver 22 having a receiving antenna 24 for receiving communication words 26. Receiver 22 is preferably also an existing component such as a remote keyless entry receiver. The remote keyless entry receiver receives the communication words and places various information therefrom on to communication bus 14.

Vehicle communication system 12 also includes a vehicle information source 28.

Vehicle information source 28, although illustrated as one component, may comprise various numbers of components within the vehicle. Vehicle information source may include but is not limited to information such as the Vehicle Identification Number (VIN) of the vehicle through which the vehicle type may be ascertained, the height of the bumpers of the vehicle, the speed, direction and location of the vehicle, and the output of various sensors of control systems throughout the vehicle.

Vehicle communication system 12 may be used to communicate with a safety system controller 34. Safety system controller 34 is used to control the operation or activation of a safety system 36. Safety system controller 34 and safety system 36 may be integrated but are illustrated as two components corresponding to their different functions. Safety system 36 may be one of a variety of types of safety systems 36 including occupant restraint devices including front and side airbags and side curtain airbags. Other types of safety systems 36 include but are not limited to braking devices or steering devices. Safety system controller 34 receives various control information from communication bus 14. Safety system controller 34 in response to other vehicle information attempts to facilitate crash mitigation actions through the control of safety system 36.

Figure 2:
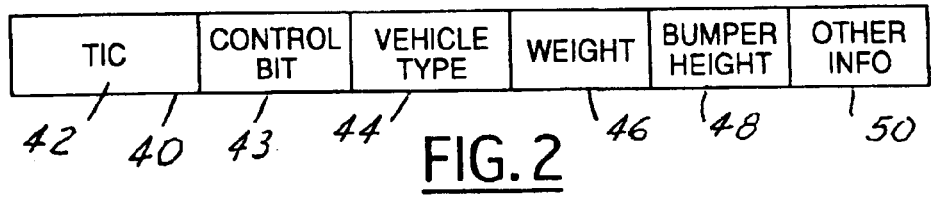
FIG. 2 is a diagrammatic representation of a communication word according to the present invention.

Referring now to FIG. 2, a communication word 40 representative of a transmitted and received communication word is illustrated. Communication word 40 has a transmitter identification code 42 that uniquely identifies the automotive vehicle 10 from which it is transmitted. The transmitter identification code 42, may for example, be used as a way in which to verify the reliability of the transmission. The communication word 40 may include a control bit 43 such as whether or not to actuate another device such as a garage door opener. In addition to the transmitter identification code 42 and control bit 43, various other information may be included for communication with other vehicles. Preferably, transmitter identification code 42 is a digital word which added thereto is further digital bits to identify other vehicle characteristics. For example, a vehicle type portion 44, a weight portion 46, a bumper height portion 48, and an "other" information portion 50 may also be included. Of course, those skilled in the art will recognize the various portions are merely illustrative. Other types of information suitable for mitigation or activation of safety devices may also be included therein. Also, various portions may also be removed without varying from the scope of the invention. Preferably, both transmitting words and receiving words have a similar format that each vehicle uses.

Figure 3:
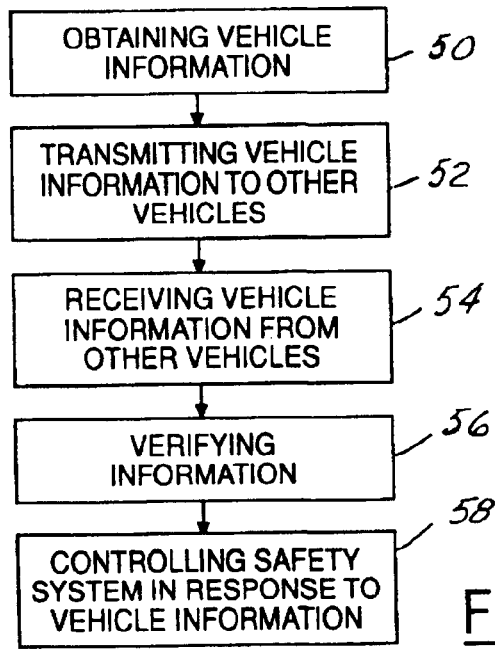
FIG. 3 is a flow chart of the operation of the communication system of FIG. 1.

Referring now to FIG. 3, a method of operating a communication system is illustrated. The vehicle communication system obtains vehicle information in step 50. Vehicle information may be obtained from vehicle information source 28 of FIG. 1. As mentioned above, vehicle information source 28 may include various numbers of vehicle information sources that are coupled to the bus 14. In step 52, information about the automotive vehicle 10 is communicated to other vehicles through transmitter 16.

In step 54, information about other nearby vehicles is received. This information is verified, preferably in receiver 22, in step 56. Verification may take many forms including checking the transmitter identification code, the parity of the bit, comparison of a check sum or other types of communication verification means.

In step 58, a safety system is controlled in response to vehicle information obtained from bus 14. Various types of mitigation strategies may be employed in vehicles including brake snubbing to change the height of bumpers or the rapid deployment of side impact airbags.

The present invention advantageously employs a vehicle communication system that uses existing vehicle components to reduce costs.

While particular embodiments of the invention have been shown and described, numerous variations and alternate embodiments will occur to those skilled in the art. Accordingly, it is intended that the invention be limited only in terms of the appended claims.

What is claimed is:

1. A communication system for an automotive vehicle comprising:
   a vehicle bus;
   a vehicle information source coupled to said vehicle bus, said vehicle information source coupling first vehicle information to said vehicle bus;
   a transmitter disposed within the first vehicle and coupled to said vehicle bus, said transmitter transmits a first communication word having a transmitter identification code and first vehicle information,
   a receiver disposed within the first vehicle coupled to said vehicle bus, said receiver receiving a second communication word from a second vehicle having second vehicle size characteristic information and coupling the second communication word to said vehicle bus;
   a safety system disposed within the first vehicle, and;
   a safety system controller disposed within the first vehicle and coupled to said bus, said safety system controller verifying the second communication word and actuating said safety system in response to said first vehicle information and said second vehicle size characteristic information.

2. The system as recited in claim 1 wherein said first and/or second vehicle information comprises at least one selected from the group of vehicle type, weight and bumper height.

3. The system as recited in claim 1 wherein said transmitter comprises a digital transmitter.

4. The system as recited in claim 1 wherein said receiver comprises a remote keyless entry receiver.

5. The system as recited in claim 1 comprises an actuation transmitter.

6. The system as recited in claim 1 wherein said actuation transmitter comprises a garage door opener transmitter.

7. The system as recited in claim 1 wherein said safety system comprises a brake system.

8. A communication system for an automotive vehicle comprising:
   a vehicle bus;
   a vehicle information source coupled to said vehicle bus, said vehicle information source coupling first vehicle information to said vehicle bus;
   an actuator transmitter disposed within the first vehicle and coupled to said vehicle bus, said transmitter transmits a first communication word having a transmitter identification code and first vehicle information,
   a remote keyless entry receiver disposed within the first vehicle coupled to said vehicle bus, said receiver receiving a second communication word from a second vehicle having second vehicle size characteristic information and coupling the second communication word to said vehicle bus;
   a safety system disposed within the first vehicle; and
   a safety system controller disposed within the first vehicle and coupled to said bus, said safety system controller verifying the second communication word and actuating said safety system in response to said first vehicle information and said second vehicle size characteristic information.

9. The system as recited in claim 8 wherein said first and/or second vehicle information comprises at least one selected from the group of vehicle type, weight and bumper height.

10. The system as recited in claim 8 wherein said transmitter comprises a digital transmitter.

11. The system as recited in claim 8 wherein said actuation transmitter comprises a garage door opener transmitter.

12. The system as recited in claim 8 wherein said safety system comprises a brake system.

13. A method of operating a communication system between a first automotive vehicle and a second automotive vehicle comprising:
   coupling first vehicle information to a vehicle bus in the first automotive vehicle;
   receiving a second transmitter identification code and second vehicle information including a vehicle size characteristic from the second automotive vehicle;
   coupling the second vehicle size characteristic information to the vehicle bus;

receiving the second vehicle size characteristic information from the vehicle bus;

verifying the second vehicle size characteristic information from the vehicle bus; and controlling a safety system in response to the first vehicle information and second vehicle information including the vehicle size characteristic.

14. The method as recited in claim 13 further comprising the step of transmitting a first transmitter identification code and first vehicle information from the first automobile.

15. The method as recited in claim 13 wherein the step of transmitting a first transmitter identification code and first vehicle information from the first automobile comprises transmitting at least one selected from the group of vehicle type, weight and bumper height.

16. The method as recited in claim 13 wherein the step of receiving a second transmitter identification code and second vehicle information comprises receiving at least one selected from the group of vehicle type, weight and bumper height.

17. The method as recited in claim 13 wherein the step of receiving a second transmitter identification code comprises receiving a second transmitter identification code and second vehicle information from a remoter keyless entry receiver.

18. The method as recited in claim 13 further comprising the step of verifying a transmitter identification code.

19. A communication system for an automotive vehicle comprising:

a multiwire vehicle bus;

a vehicle information source coupled to said vehicle bus, said vehicle information source coupling first vehicle information to said vehicle bus;

a transmitter coupled to said vehicle bus, said transmitter transmits a first communication word having a transmitter identification code and first vehicle information, a receiver coupled to said vehicle bus, said receiver receiving a second communication word having second vehicle size characteristic information and coupling the second communication word to said vehicle bus, said receiver receiving a third communication word having third vehicle size characteristic information and coupling the third communication word to said vehicle bus;

a safety system; and a safety system controller coupled to said bus, said safety system controller actuating said safety system in response to said first vehicle information, said second vehicle size characteristic information and said third vehicle size characteristic information.

* * * * *